(12) United States Patent
Zhou et al.

(10) Patent No.: US 11,036,241 B2
(45) Date of Patent: Jun. 15, 2021

(54) SIMPLE MULTI-SENSOR CALIBRATION

(71) Applicant: SZ DJI TECHNOLOGY CO., LTD., Shenzhen (CN)

(72) Inventors: You Zhou, Shenzhen (CN); Lei Han, Shenzhen (CN); Jianzhao Cai, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 146 days.

(21) Appl. No.: 16/207,144

(22) Filed: Dec. 2, 2018

(65) Prior Publication Data

US 2019/0113537 A1 Apr. 18, 2019

Related U.S. Application Data

(63) Continuation of application No. PCT/CN2016/084753, filed on Jun. 3, 2016.

(51) Int. Cl.
| | |
|---|---|
| *G05D 1/10* | (2006.01) |
| *G01C 25/00* | (2006.01) |
| *B64C 39/02* | (2006.01) |
| *G01P 21/00* | (2006.01) |
| *G05D 1/00* | (2006.01) |

(52) U.S. Cl.
CPC ........... *G05D 1/106* (2019.05); *B64C 39/024* (2013.01); *G01C 25/00* (2013.01); *G01P 21/00* (2013.01); *G05D 1/0011* (2013.01); *G05D 1/102* (2013.01); *B64C 2201/146* (2013.01)

(58) Field of Classification Search
CPC ...... G05D 1/106; G05D 1/102; G05D 1/0011; B64C 39/024; B64C 2201/146; G01P 21/00; G01C 25/00
See application file for complete search history.

(56) References Cited

U.S. PATENT DOCUMENTS

| | | | |
|---|---|---|---|
| 9,681,118 B2 * | 6/2017 | Protter | ................. H04N 13/254 |
| 2008/0195316 A1 | 8/2008 | Krishnaswamy | |
| 2020/0012829 A1 * | 1/2020 | Davidson | ............... G01C 21/28 |

FOREIGN PATENT DOCUMENTS

| | | |
|---|---|---|
| CN | 102955478 A | 3/2013 |
| CN | 103611324 A | 3/2014 |
| CN | 103914065 A | 7/2014 |

(Continued)

OTHER PUBLICATIONS

The World Intellectual Property Organization (WIPO) International Search Report and Written Opinion for PCT/CN2016/084753 dated Feb. 21, 2017 8 pages.

*Primary Examiner* — Michael V Kerrigan

(74) *Attorney, Agent, or Firm* — Anova Law Group, PLLC

(57) ABSTRACT

A computer-implemented method includes detecting a change in a spatial configuration of a plurality of sensors coupled to an unmanned aerial vehicle (UAV) based on a first set of sensor data from a plurality of sensors, generating one or more calibration instructions to cause the UAV to move along a predetermined pattern in response to detecting the change in the spatial configuration, and determining a subsequent spatial configuration of the plurality of sensors based at least in part on a second set of sensor data from the plurality of sensors. The second set of sensor data is collected by the plurality of sensors when the UAV is moving along the predetermined pattern.

28 Claims, 13 Drawing Sheets

(56) References Cited

FOREIGN PATENT DOCUMENTS

| CN | 105492985 A | 4/2016 |
|----|-------------|--------|
| WO | 2016023224 A1 | 2/2016 |
| WO | 2016054004 A1 | 4/2016 |

* cited by examiner

SIMPLE MULTI-SENSOR CALIBRATION

CROSS-REFERENCE TO RELATED APPLICATION

This application is a continuation of International Application No. PCT/CN2016/084753, filed on Jun. 3, 2016, the entire content of which is incorporated herein by reference.

BACKGROUND OF THE DISCLOSURE

Modern unmanned aerial vehicles (UAVs) are typically equipped with various sensors for collecting data used for performing a variety of tasks such as navigation, surveillance and tracking, remote sensing, search and rescue, scientific research, and the like. The sensors, susceptible to external and internal forces or errors, typically require occasional calibration to ensure precise and reliable collection of data.

SUMMARY OF THE DISCLOSURE

According to some embodiments, a computer-implemented method is provided. The method comprises detecting, based on a first set of sensor data from a plurality of sensors coupled to an unmanned aerial vehicle (UAV), a change in a spatial configuration of the plurality of sensors from an initial spatial configuration to a subsequent spatial configuration; in response to detecting the change in the spatial configuration, generating one or more calibration instructions to cause the UAV to move along a predetermined pattern; and determining the subsequent spatial configuration of the plurality of sensors based at least in part on a second set of sensor data from the plurality of sensors, wherein the second set of sensor data is collected by the plurality of sensors when the UAV is moving along the predetermined pattern.

According to some embodiments, a computer system is provided. The computer system comprises a memory that stores one or more computer-executable instructions; and one or more processors configured to access the memory and execute the computer-executable instructions to perform steps comprising detecting, based on a first set of sensor data from a plurality of sensors coupled to an unmanned aerial vehicle (UAV), a change in a spatial configuration of the plurality of sensors from an initial spatial configuration to a subsequent spatial configuration; in response to detecting the change in the spatial configuration, generating one or more calibration instructions to cause the UAV to move along a predetermined pattern; and determining the subsequent spatial configuration of the plurality of sensors based at least in part on a second set of sensor data from the plurality of sensors, wherein the second set of sensor data is collected by the plurality of sensors when the UAV is moving along the predetermined pattern.

According to some embodiments, one or more non-transitory computer-readable storage media is provided. The one or more non-transitory computer-readable storage media stores computer-executable instructions that, when executed by a computing system, configure the computing system to perform operations comprising detecting, based on a first set of sensor data from a plurality of sensors coupled to an unmanned aerial vehicle (UAV), a change in a spatial configuration of the plurality of sensors from an initial spatial configuration to a subsequent spatial configuration; in response to detecting the change in the spatial configuration, generating one or more calibration instructions to cause the UAV to move along a predetermined pattern; and determining the subsequent spatial configuration of the plurality of sensors based at least in part on a second set of sensor data from the plurality of sensors, wherein the second set of sensor data is collected by the plurality of sensors when the UAV is moving along the predetermined pattern.

According to some embodiments, a method for sensor calibration is provided. The method comprises detecting, based on a first set of sensor data from a plurality of sensors coupled to movable object, a change in a spatial configuration of the plurality of sensors from an initial spatial configuration to a subsequent spatial configuration; in response to detecting the change in the spatial configuration, collecting a second set of sensor data from the plurality of sensors while the movable object moves along a predetermined calibration pattern; and determining the subsequent spatial configuration of the plurality of sensors based at least in part on the second set of sensor data. The movable object can include a UAV.

In some embodiments, the plurality of sensors comprises at least two different types of sensors. The plurality of sensors can comprise at least two vision sensors and an inertial sensor.

In some embodiments, generating the one or more calibration instructions can comprise selecting the predetermined pattern from a plurality of predetermined paths based at least in part on the plurality of sensors.

In some embodiments, moving along the predetermine pattern can include making translational movements and rotational movements.

In some embodiments, the one or more calibration instructions include human-readable user instructions that are displayed on a user interface. The human-readable user instructions can describe how to manually move the UAV along the predetermined pattern. The human-readable user instructions can describe how to remotely control the UAV to move along the predetermined pattern.

In some embodiments, the one or more calibration instructions include computer-executable calibration instructions that are executed by one or more processors onboard the UAV so as to cause the UAV to move along the predetermined pattern.

In some embodiments, the one or more calibration instructions include computer-executable calibration instructions that are executed by one or more processors onboard the UAV so as to cause the UAV to move along the predetermined pattern.

In some embodiments, determining the subsequent spatial configuration comprises determining a first spatial relationship between at least two vision sensors of the plurality of sensors based at least in part on the second set of sensor data; and determining a second spatial relationship between a vision sensor and an inertial sensor of the plurality of sensors based at least in part on the second set of sensor data.

In some embodiments, determining the subsequent spatial configuration further comprises determining a parameter of the first spatial relationship based at least in part on sensor data from a position sensor.

In some embodiments, the parameter of the first spatial relationship is a baseline distance between the at least two vision sensors.

In some embodiments, determining the parameter of the first spatial relationship comprises determining a first estimated value of a state of the UAV using the at least two vision sensors and the inertial sensor; determining a second estimated value of the state of the UAV using the position sensor and the inertial sensor; and processing the first estimated value and the second estimated value to determine the parameter of the first spatial relationship.

In some embodiments, the state of the UAV comprises a velocity.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Conventional sensor calibration techniques usually require specialized calibration equipment and complex calibration procedures. For instance, traditional camera calibration typically requires the use of calibration boards with certain calibration pattern (e.g., checkerboard patterns), or a projection screen with such patterns. A camera captures images of the calibration pattern positioned at different poses so that the camera views the calibration pattern at different viewing planes. The images data is then processed to determine the intrinsic and extrinsic parameters of the camera. Such conventional calibration techniques suffer from several drawbacks. The calibration board may be costly, bulky, and not easily transportable to any location where sensor calibration is needed (e.g., in an outdoor environment). Positioning the calibration board at different poses to ensure that the camera captures the required information for calibration can be a time-consuming and tedious process for a user.

The systems, devices, and methods of the present disclosure provide simplified techniques for calibrating multiple sensors onboard a UAV without requiring specialized calibration equipment and complex calibration procedures. In particular, the UAV can be controlled to move along a predetermined calibration path or pattern while the sensors on the UAV collects sensor data. The predetermined calibration path or pattern can include simple geometric patterns (e.g., oval). The UAV can be controlled manually (e.g., by hand) or remotely (via a remote controller) based on calibration instructions. Alternatively, the UAV may be controlled autonomously to move along the calibration path or pattern. The collected sensor data can then be processed to calibrate the multiple sensors including different types of sensors.

Figure 1:
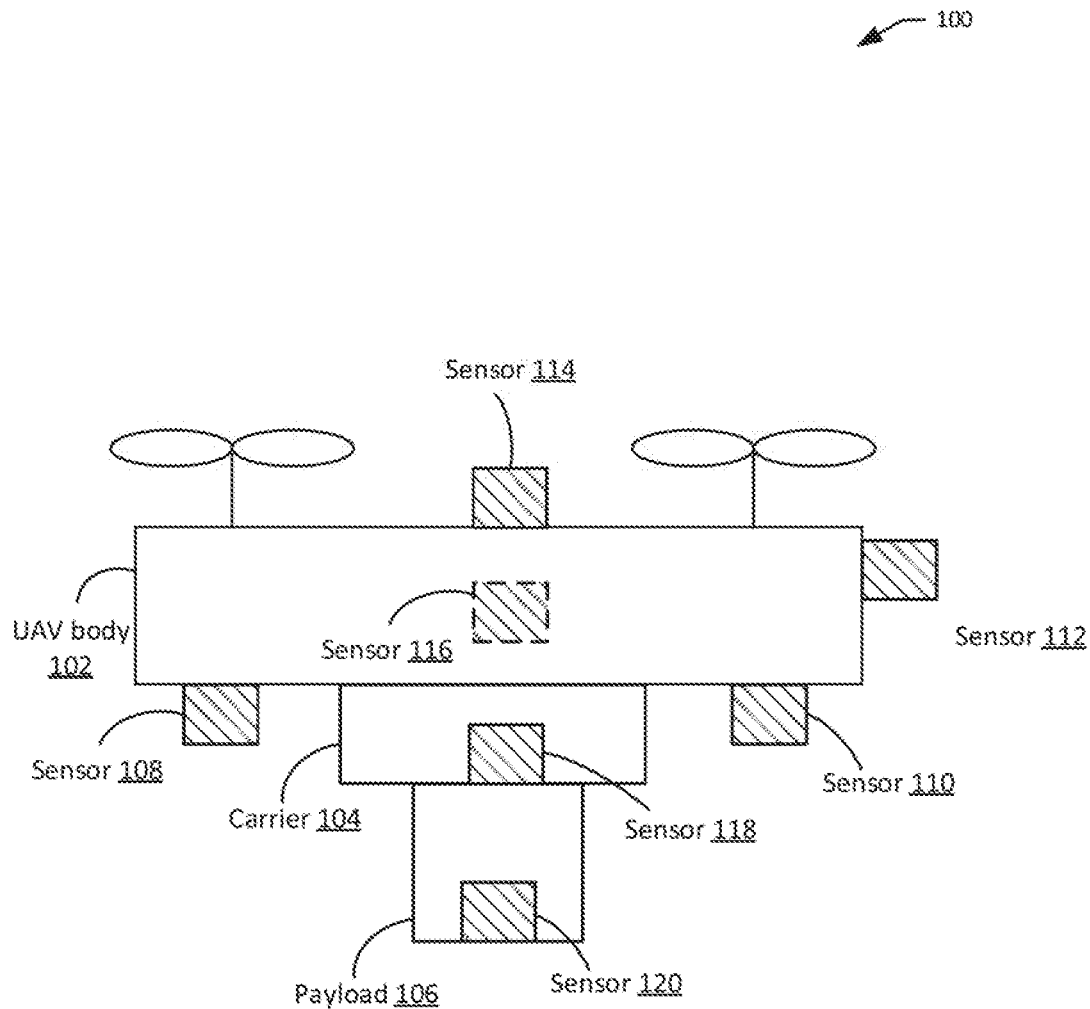
FIG. 1 illustrates shows an example of an unmanned aerial vehicle (UAV) with sensors, in accordance with embodiments.

FIG. 1 illustrates shows an example of an unmanned aerial vehicle (UAV) 100 with sensors, in accordance with embodiments. The UAV 100 may be controlled by a remote controller and/or one or more processors onboard the UAV 100 to move with up to six degrees of freedom (e.g., translation and rotation movement with respect to up to three axes). The UAV 100 may be optionally coupled with a carrier 104, which may be configured to carry a payload 106. In some embodiments, the carrier 104 may be controlled by a remote controller, a controller coupled to the carrier, and/or one or more processors onboard the UAV 100 to move the payload 106 relative to the UAV 100 with up to six degrees of freedom.

The UAV 100 may have on board sensors that can collect sensor data while the UAV 100 is in operation or at rest. The sensors may be disposed on any suitable portions of the UAV 100, the carrier 104, and/or the payload 106. The sensors 116 may be attached to the inside of a body 102 of the UAV 100. The sensors 108, 110, 112, 114 may be attached to the outside of the body of the UAV 100. The sensors 118 may be attached to the carrier 104 and/or the sensors 120 may be attached to the payload 106. The sensors may be centrally located in a single region on the body. Alternatively, the sensors may be located in different locations on the body. The sensors may be permanently or removably attached to the UAV 100, the carrier 104, and/or the payload 106.

The UAV 100 may be configured to carry a wide variety of sensors. The sensors may comprise vision sensors such as a monocular camera, stereo vision camera, radar, sonar, or an infrared camera. The sensors may further comprise inertial sensors (e.g., inertial measurement units (IMUs), gyroscopes, accelerometers), position sensors (e.g., location sensors such as global positioning system (GPS) sensors and proximity sensors such as ultrasonic sensors, infrared sensors, and lidar sensors), other types of sensor.

Sensor data obtained from the various sensors may be used to determine (including estimating) a state of the UAV, carrier, and/or payload such as a location, a pose (e.g., position and orientation), a velocity, an acceleration, and the like. The sensors data may also be used to determine a state of the surrounding environment such as weather, obstacles, and the like. The sensor data may be used for mapping of a location, navigation between locations, detection of obstacles, or detection of a target. Sensor data from a single sensor may be used to determine any one of the aforementioned information. Alternatively, sensor data from multiple sensors can be combined for the determination.

The reliability of the sensor data depends on an accurate knowledge of the configuration of the sensors. The sensors may have an initial configuration. The initial configuration of sensors can drift away from the initial and/or optimal setting. Therefore, periodic calibration of the sensors to determine the actual configuration can be beneficial, and in some cases necessary to preserve quality or reliability of the collected sensor data.

The configuration of the sensors can include an internal configuration (characterized by intrinsic sensor parameters) and an external configuration (characterized by extrinsic sensor parameters). Intrinsic parameters may be any parameters that are dependent on hardware configurations, in some cases the intrinsic parameters may be set by a factory setting for the sensor. Examples of intrinsic parameters may include focal length, scale factor, radial distortion coefficients, and tangential distortion coefficients. Intrinsic parameters may be specific to a sensor and may vary infrequently. Recalibration of intrinsic parameters may occur periodically while a UAV is not operating. It may not be critical to recalibrate intrinsic parameters while the UAV is operating because these parameters remain relatively consistent while the UAV is operating in comparison to extrinsic parameters. Intrinsic parameters may be calibrated by interpreting an image of a known calibration standard or target. Vanishing lines or points on a calibration standard or target may be used to calibrate the intrinsic parameters such as focal length and distortion.

Figure 2:
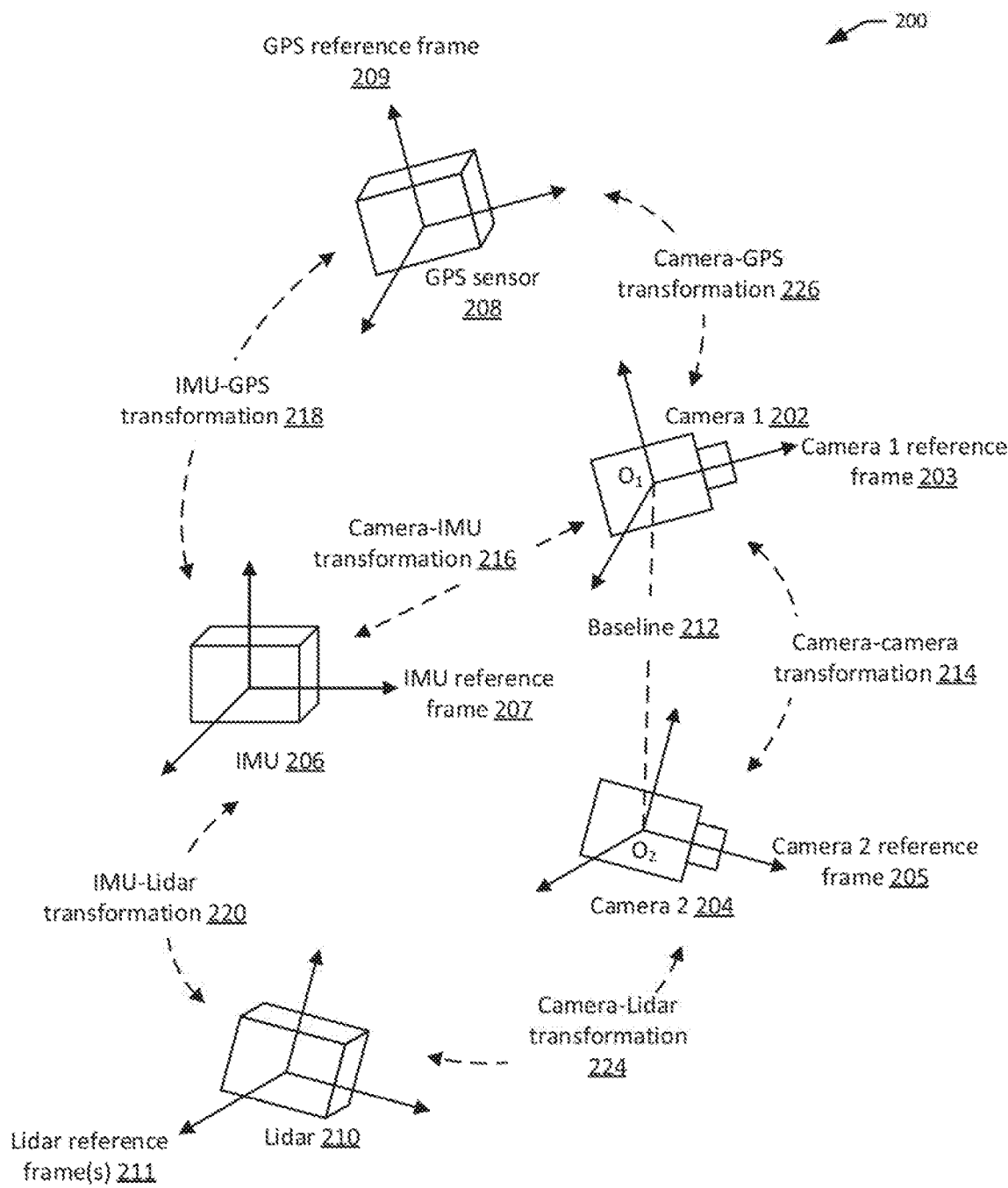
FIG. 2 illustrate the transformation of reference frames among exemplary sensors, in accordance with embodiments.

Extrinsic parameters may relate to the spatial relationship (e.g., relative position and/or orientation) between any two or more sensors. Each sensor may have a relative reference frame independent of other sensors on board the UAV. Extrinsic parameters may be important for sensor fusion, combining data from sensors in different locations on the UAV. Sensor fusion may involve a process of transforming the relative reference frames of a given sensor to match the reference frame of another sensor, as illustrated in FIG. 2.

The extrinsic parameters may have an initial calibration. The initial calibration of the extrinsic parameters may describe relative differences between the sensors, e.g., relative locations, rotations, and/or displacements of two or more sensors. The parameters may include changes to sensors over time, such as displacements of sensors between a certain time and a subsequent time. The displacements may include translational displacement and/or rotational displacement. The translational displacement may occur along one or more of the three axes. Similarly, the rotational displacement may occur in one or more of the three axes.

Extrinsic parameters may deviate from their initial configuration at a higher frequency compared to intrinsic parameters. For example, vibration or environmental factors during the transportation, take-off or landing of the UAV, thermal effects, and other factors may cause changes in the extrinsic parameters of the sensors. Therefore, a recalibration of the extrinsic parameters may be performed more frequently than a recalibration of the intrinsic parameters. In some embodiments, recalibration of the extrinsic parameters may be performed before or after a take-off of the UAV, or during the flight of a UAV.

Traditional sensor calibration techniques typically require specialized equipment (e.g., a checkerboard for vision sensor calibration) and a complex process, especially when multiple different types of sensors need to be calibrated. In that case, different calibration procedures may be performed to calibrate different sets of sensors, increasing the complexity of the overall calibration process. The techniques described herein provide a simple yet effective calibration process for calibrating multiple types of sensors using a unified user-friendly data collection process. For example, in an embodiment, a user simply holds the UAV and moves the UAV along a geometric pattern (e.g., oval) while the UAV collects the sensor data to be used for calibration. Thus the described process for data collection does not require the use of specialized calibration equipment and special procedures. Additionally, once the sensor data is collected from the simple data collection movements, the sensor data can be used to calibrate multiple different types of sensors. Thus, there is no need to employ different data collection and calibration procedures for different types of sensors, as typically required by traditional calibration techniques. Accordingly, the techniques described herein can enhance the efficiency, cost, and user experience associated with sensor calibration.

FIG. 2 illustrate transformation of reference frames among exemplary sensors, in accordance with embodiments. Specifically, FIG. 2 shows a plurality of sensors and their associated reference frames. Extrinsic calibration of the sensors includes determining the transformation from one reference frame to another. For example, coordinates under a first coordinate system of a first reference frame of one sensor can be transformed to corresponding coordinates under a second coordinate system of a second reference frame of another sensor. In some embodiments, the transformation can be expressed mathematically by a transformation matrix. In some embodiments, the transformation matrix can be expressed by a rotation matrix R and a translation matrix T, both considered extrinsic parameters. The transformation of reference frames can be based on a spatial relationship between the sensors. The spatial relationship may be characterized by the relative translational and/or rotational displacement between the sensors. Alternatively or additionally, the spatial relationship may be characterized by a deviation from an initial spatial relationship of the sensors.

For example, FIG. 2 shows a camera 1 202, with its associated camera 1 reference frame 203 and a camera 2 204 with its associated reference frame 2 205. The two cameras may or may not form a stereo vision system. A camera-camera transformation 214 can be used to transform between the two camera reference frames. In particular, coordinates in the camera 1 reference frame 203 can be transformed to coordinates in the camera 2 reference frame 205, or vice versa. The transformation may be based on a spatial configuration or spatial relationship between the two cameras. The spatial relationship which may include a translational and/or rotational displacement between the two cameras with respect to one, two, or more axes of a reference frame. Calibration of the two cameras can include determining extrinsic parameters representing the spatial relationship and and/or the transformation. For example, the extrinsic parameters can include a baseline distance 212 between optical centers of the two cameras.

FIG. 2 further illustrates other exemplary sensors, IMU 206, GPS sensor 208, and lidar 210, with their respective reference frames, IMU reference frame 207, GPS reference frame 209, and lidar reference frame 210. The exemplary transformation between the various sensor reference frames is illustrated. For example, camera-GPS transformation 226 can be used to transform coordinates in the camera 1 reference frame 203 to corresponding coordinates in the GPS reference frame 209, or vice versa. Camera-IMU transformation 216 can be used to transform coordinates in the camera 1 reference frame 203 to corresponding coordinates in the IMU reference frame 207, or vice versa. Camera-lidar transformation 224 can be used to transform coordinates in the camera 2 reference frame 205 to corresponding coordinates in the lidar reference frame 211, or vice versa. IMU-GPS transformation 218 can be used to transform coordinates in the IMU reference frame 207 to corresponding coordinates in the GPS reference frame 209, or vice versa. IMU-lidar transformation 220 can be used to transform coordinates in the IMU reference frame 207 to corresponding coordinates in the lidar reference frame 211, or vice versa. Accurate knowledge of the transformation between the various reference frames of the sensors may be necessary for reliable fusion of measurements from the respective sensors.

According to aspects of the present disclosure, a simple process is provided for sensor calibration without requiring specialized calibration equipment (e.g., checkerboard). Specifically, sensor data from multiple sensors can be collected in a simple and user-friendly collection process and the collected sensor data can be used calibrate the multiple sensors.

Figure 3:
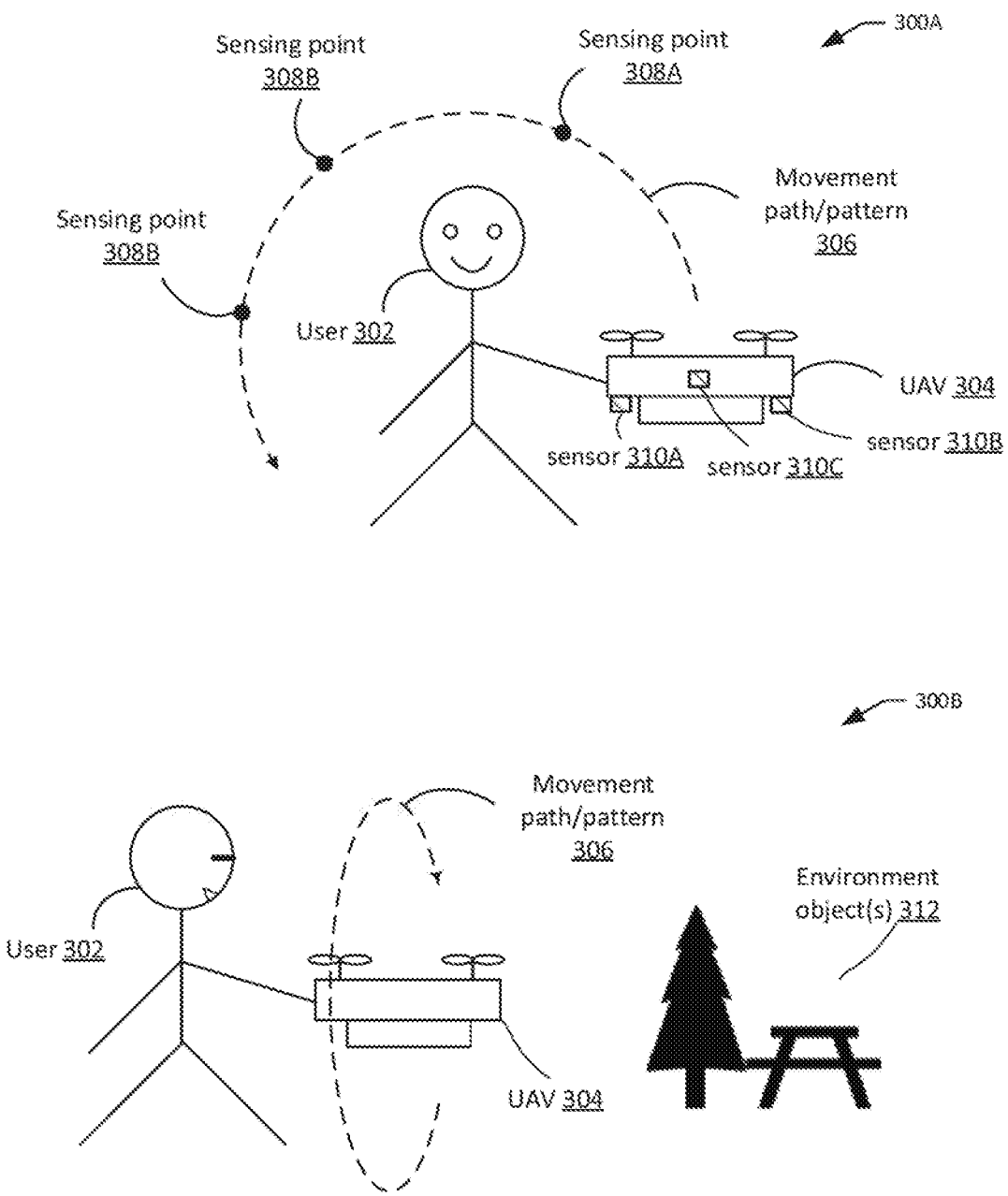
FIG. 3 illustrates an exemplary method for collecting sensor data for calibration, in accordance with embodiments.

FIG. 3 illustrates an exemplary method for collecting sensor data for calibration, in accordance with embodiments. As illustrated by the front view 300A and the side view 300B, a user 302 can hold and move the UAV 304 along a predetermined calibration movement path or pattern 306, such as a curve or a circle (e.g., clockwise or counterclockwise) in front of the user 302. It is understood that the phrase "moving along" implies moving approximately or substantially along, or moving within an acceptable margin of error from the predetermined path or pattern. The UAV 304 may or may not carry a carrier and/or a payload when it is moved for calibration purposes. When the UAV 304 moves along the path 306, the sensors 310A, 310B, 310C of the UAV can be configured to collect sensor data at various sensing points 308A, 308B, and 308C along the path 306. The collected sensor data can then be processed, by one or more processors onboard and/or offboard the UAV, to calibrate the sensors.

Moving the UAV along the predetermined path or pattern may cause translational movements and/or rotational movements of the UAV with respect to any of the three axes of freedom. For instance, as the user moves the UAV along a substantially circular path as shown in FIG. 3, the user may not only change the position of UAV (e.g., altitude, latitude, and/or longitude), but also the orientation of the UAV (e.g., yaw, pitch, and/or roll). Accordingly, the UAV may have different spatial dispositions (e.g., positions and/or orientations) at the different sensing points. In some embodiments, the movements of the UAV may be selected based at least in part on the types of sensors to be calibrated in order to improve accuracy of the calibration process, as explained in further details in FIG. 8.

The sensors may be configured to collect sensor data at different sensing points. The sensing points may indicate when one or more of the sensors onboard the UAV collect sensor data. The sensing points can be selected based on time. For instance, the sensors can be configured to collect sensor data at a specific frequency (e.g., every 0.1 second, 0.5 second, 1 second, 2 seconds, etc.) or at certain points in time from a reference point in time (e.g., at 0.2 second, 0.4 second, and 1 second from a starting time). The sensing points can also be selected based on spatial disposition (e.g., position/orientation) of the UAV. The sensing points can also be selected based on occurrence of certain events (e.g., a change of orientation of the UAV). In some embodiments, the sensing points may be selected randomly or pseudo-randomly.

In some embodiments, the sensors may be configured to collect the sensor data at the same sensing points or at different sensing points. For instance, some sensors may be configured to collect sensor data at a higher frequency than some other sensors. In some embodiments, some or all of the sensors may be configured to collect data continuously, rather than at discretely-spaced sensing points.

The sensor data can be related to an environment of the UAV 304. For instance, a pair of vision sensors 310A and 310B can be configured to capture images of the objects 312 within the fields of view of the vision sensors when the UAV 304 is moving along the calibration movement path. Alternatively or additionally, the sensor data can be related to a state of UAV. For example, an IMU 310C can be configured to measure a linear and/or angular acceleration of the UAV as it moves along the calibration movement path. Exemplary calibration methods for processing the collected sensor data are discussed in further detail in FIGS. 10-11.

Figure 4:
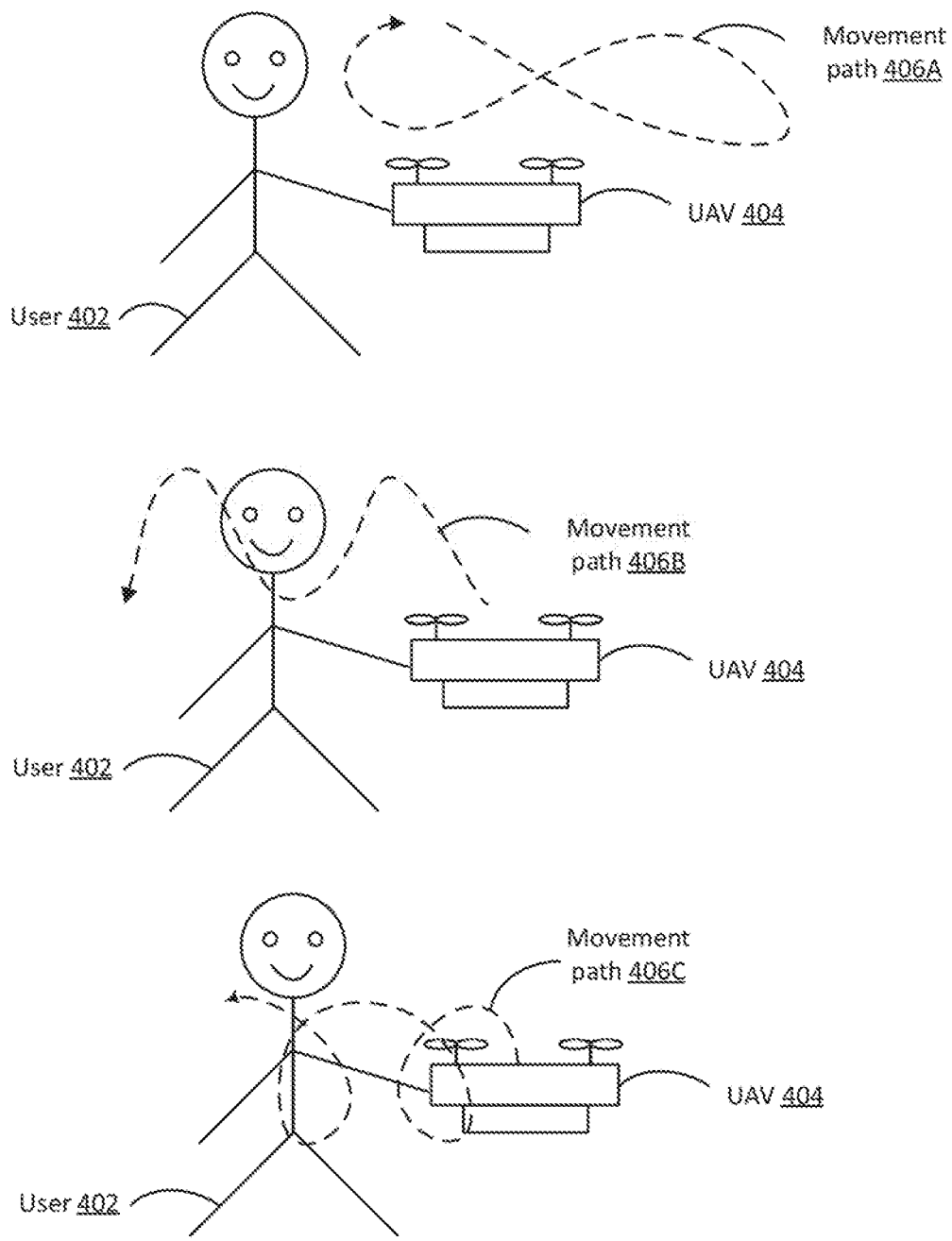
FIG. 4 illustrates other exemplary movement paths or patterns for collecting sensor data for calibration, in accordance with embodiments.

FIG. 4 illustrates other exemplary movement paths or patterns for collecting sensor data for calibration, in accordance with embodiments. For instance, a user 402 may move a UAV 404 in a figure "8" pattern 406A, a wavy pattern 406B, or a zigzag or spiral pattern 406C, as illustrated, while the sensors onboard the UAV 404 (not shown) collect sensor data for calibration. The patterns can include any other suitable lines or geometric patterns (e.g., triangle, oval) in other embodiments. The patterns may comprise one or more continuous lines or disconnected lines.

In some embodiments, the path may be selected so as to be easy to execute by a user. For instance, the path may comprise a relative simple geometric pattern (e.g., circle). As another example, he movements of the UAV may occur substantially in front of a user to facilitate easy handling by the user. In other embodiments, the movement of the UAV may occur on alongside the user, above the user, behind the user, or at any other suitable spatial locations.

A user 402 may hold the UAV 404 at any suitable portion of the UAV 404, such as a handle, an extension, or the main body of the UAV. For instance, the user may hold one or more landing legs of the UAV (not shown). As another example, a user may hold one or more arms of the UAV connecting the rotors. A user may hold the UAV with one or both hands or any other suitable body parts. In some examples, the user may hold UAV indirectly using a mechanical device such as a pole, a stick, a clasp, a robotic arm, and the like.

As illustrated above in FIGS. 3-4, the UAV may be moved manually by a user in simple movements to collect sensor data for sensor calibration without requiring specialized calibration equipment such as a checkerboard. Alternatively, the UAV may be controlled by other means to move along any suitable calibration paths such as described herein.

In some embodiments, feedback information with respect to the calibration process may be provided to a user. For instance, the feedback information may include a message confirming the successful collection of sensor data. Or, the feedback information may include a request to the user to repeat some or all of the calibration movements of the UAV. The feedback information may be provided at any suitable time. For instance, the feedback may be provided during or after the calibration movements. The feedback information can be provided by the same channel (e.g., user interface) that provides the calibration instructions or by a different channel.

Figure 5:
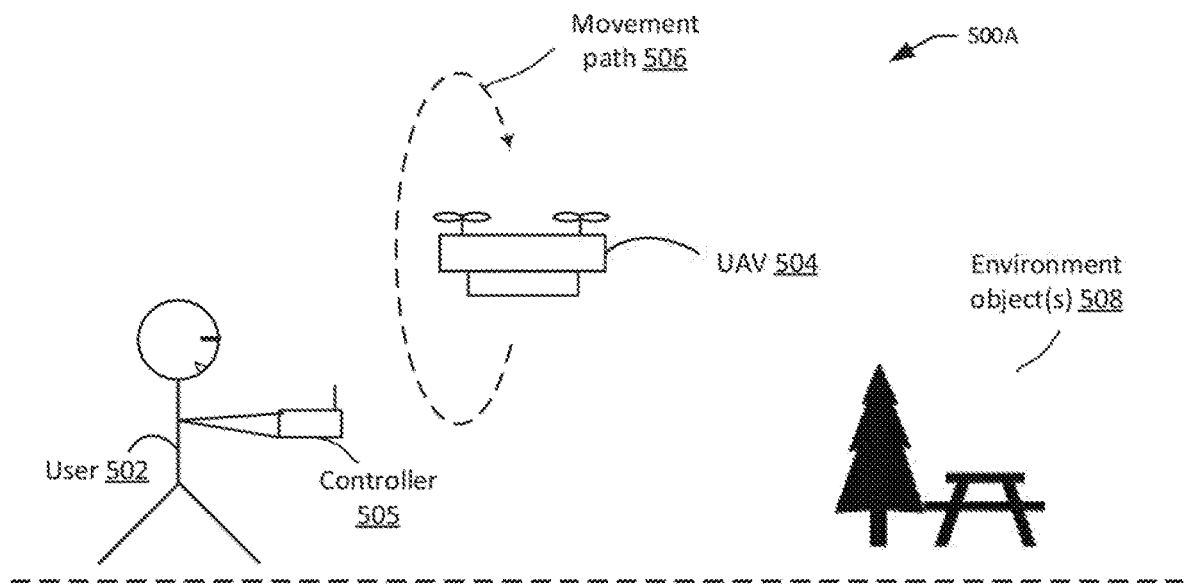
FIG. 5 illustrates alternative methods for collecting sensor data for calibration, in accordance with embodiments.
Figure 5:
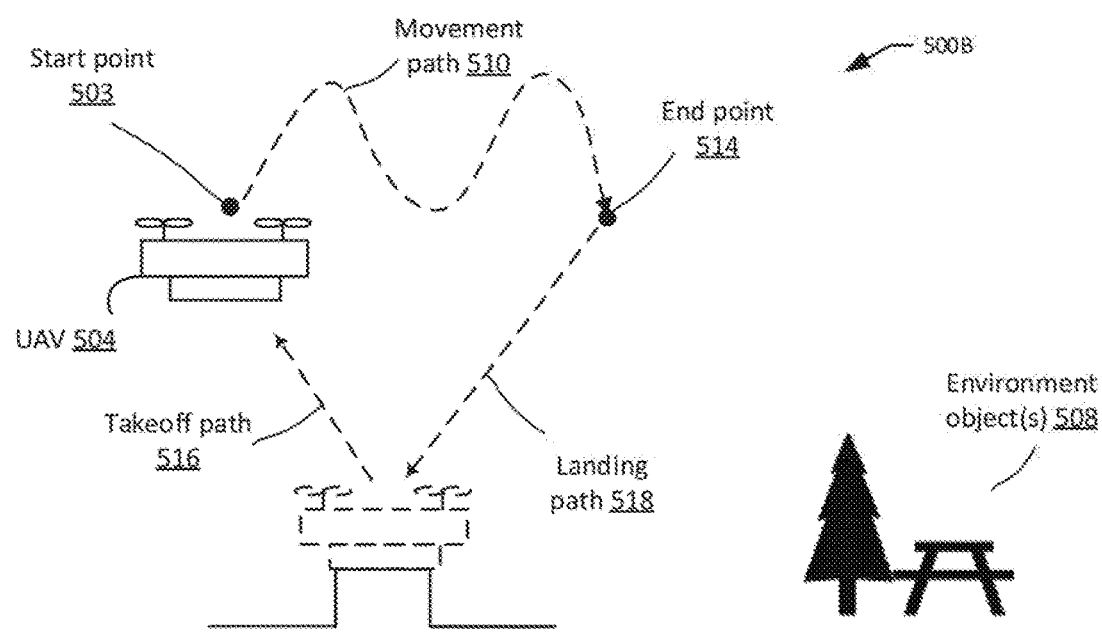

FIG. 5 illustrates alternative methods for collecting sensor data for calibration, in accordance with embodiments. For instance, in the illustrated method 500A, a UAV 504 may be controlled by a remote controller 505 operated by a user 502 to move along a predetermined calibration path or pattern 506, while the sensors onboard the UAV 504 collect sensor data for calibration, such as sensor data related to objects 508 in a surrounding environment of the UAV 504 (e.g., images) and/or sensor data related to a state of the UAV 504 (e.g., acceleration).

In some other embodiments, such as in the illustrated method 500B, the UAV 504 can be controlled, by one or more processors onboard the UAV, to autonomously follow a calibration movement path 510 without requiring user intervention via a remote controller. In some embodiments, the UAV may be configured to autonomously navigate to a start point 503 of the movement path 510 before starting to follow the calibration movement path 510 while collecting sensor data for calibration. For instance, if the UAV is in space before calibration starts, the UAV may navigate directly to the start point 503. If the UAV is landed before calibration starts, the UAV may be configured to autonomously takeoff along a takeoff path 516 and navigate to the start point 503. The step of navigating to the start point may be optional if the UAV is already located at or near the start point. When the UAV finishes collecting data for calibration, the UAV may be configured to resume a previous task (e.g., navigation, tracking) or hover in place. Alternatively, the UAV may be configured to autonomously land from an end point 514 of the movement path 510 along a landing path 518 after finishing the collection of sensor data. The UAV may or may not land at or near the same place for takeoff. In some embodiments, the takeoff path 516 and/or the landing path 518 may be a part of the movement path 510 itself.

In some embodiments, the collection of sensor data can also be controlled independently from the navigation of the UAV to follow the calibration movement path. For instance, the UAV may be controlled by a remote controller to move along a calibration movement path, while the sensors of the UAV may be controlled autonomously by one or more processors onboard the UAV to collect sensor data; or vice versa. In some other examples, the sensor collection and the navigation may be both controlled by a remote controller or they may both be controlled by one or more processors onboard the UAV.

Figure 6:
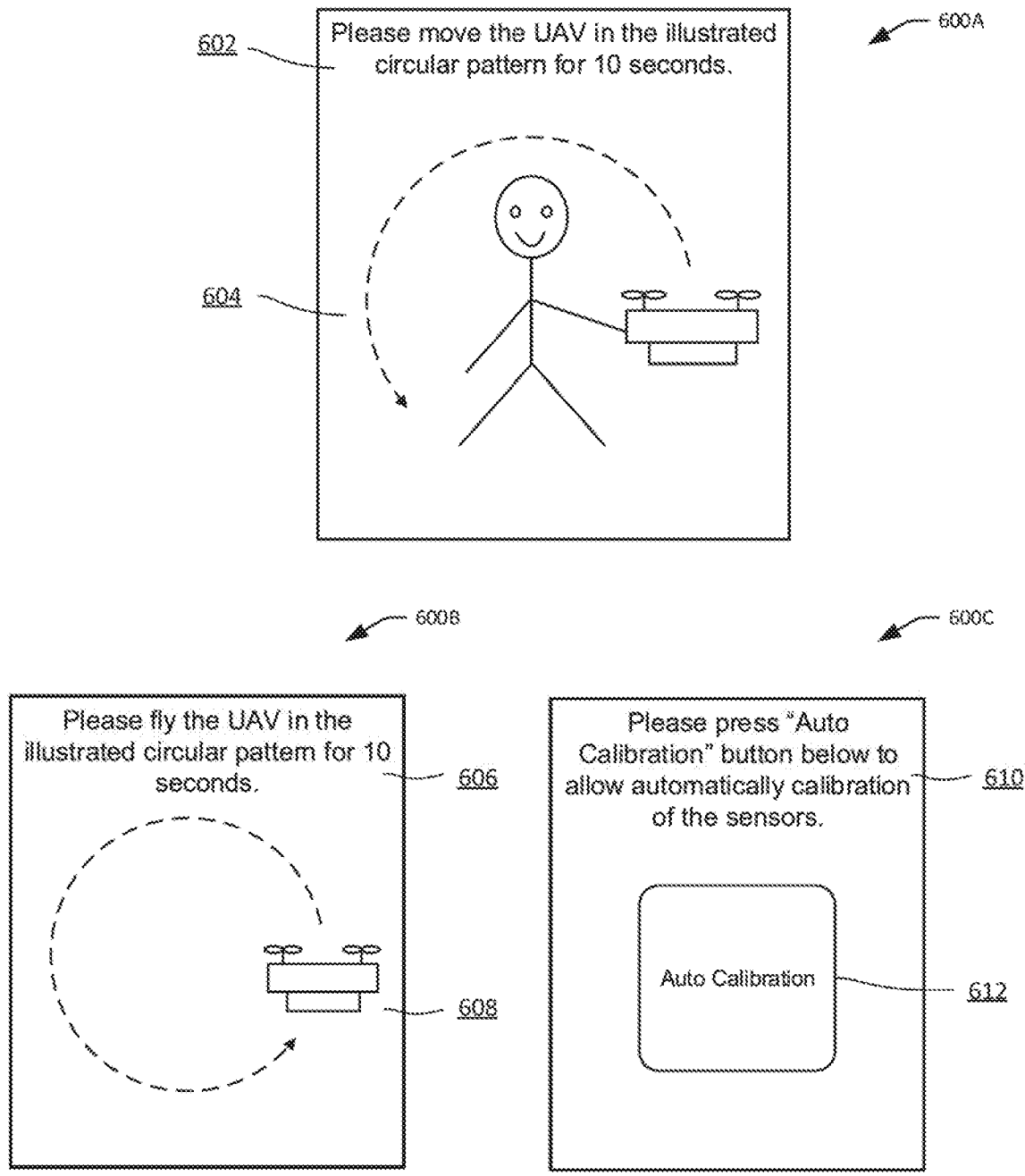
FIG. 6 illustrates exemplary user interfaces for providing calibration instructions, in accordance with embodiments.

In some embodiments, calibration instructions may be provided to facilitate sensor calibration. For instance, user instructions about sensor calibration may be provided to a user via a user interface. FIG. 6 illustrates exemplary user interfaces for providing calibration instructions, in accordance with embodiments. The instructions provided via the user interface can include text, icons, image data (e.g., still images, videos, computer-generated graphics), audio data, haptic data (e.g., Braille, vibration, heat), and any other type of data that can be read, heard, otherwise sensed by a user. The user interface may be provided on a display, a speaker, or a touchpad, any other suitable output element of a remote controller, a mobile device (e.g., smartphone, tablet, laptop), a UAV, or any other suitable device configured to receive the calibration instructions. For example, the user interface may be provided by an application (e.g., mobile app) running on a device. The device the provides the user interface may or may not be the same device that generates the calibration instructions. For instance, the instructions may be generated by a mobile device which also displays the instructions. As another example, the instructions may be generated by a remote controller or UAV and displayed on a mobile device that communicates with the remote controller or UAV.

In some embodiments, the calibration instructions can include movement instructions related to controlling the UAV to move along a predetermined path or pattern. The calibration instructions can also include data collection instructions related to the controlling the sensors to collect data for calibration. For instance, the movement instructions can describe a pattern or path to move the UAV, detailed steps for moving the UAV (e.g., translational moves and/or rotational moves), a duration of the movements, and the like. The calibration instructions can also include data collection instructions related to the controlling the sensors to collect data for calibration. For example, the data collection instructions can include a group of sensors to be enabled for data collection, the timing, frequency, amount, and/or duration of the data collection, and the settings of the sensors (e.g., resolution, shutter speed, focal length, frame rate).

The instructions provided by the user interface may be related to actions to be performed by a user for manually and/or remotely controlling the UAV. For example, the instructions can describe how to manually move a UAV (e.g., using a hand) along a predetermined calibration movement path for calibration purposes. As illustrated by user interface 600A, the instructions can include a description 602 ("Please move the UAV in the illustrated circular pattern for 10 seconds.") and an illustration 604 of how a user may move the UAV using a hand. As another example, the instructions may describe how a user may remotely control a UAV to move along a predetermined calibration path. As illustrated by user interface 600B, the instructions can include a description 606 ("Please fly the UAV in the illustrated circular pattern for 10 seconds.") and an illustration 608 of a flight path that the UAV can be controlled to navigate (e.g., via a remote controller). As yet another example, the instructions can allow a user to delegate the calibration tasks to the UAV. As illustrated by user interface 600C, the instructions can include a description 610 ("Please press "Auto Calibration" button below to allow automatically calibration of the sensors.") and a button 612. When the user presses on the button 612, commands may be transmitted the UAV for autonomously move along a pre-determined calibration path and/or to collect sensor data during the movement.

In some embodiments, the instructions provided by the user interface may additionally include information related to the collection of sensor data for calibration. For instance, the user interface may include instructions about when and how to collect sensor data.

In some embodiments, the user interface can be used to provide feedback information with respect to the calibration process such as discussed elsewhere herein.

Figure 7:
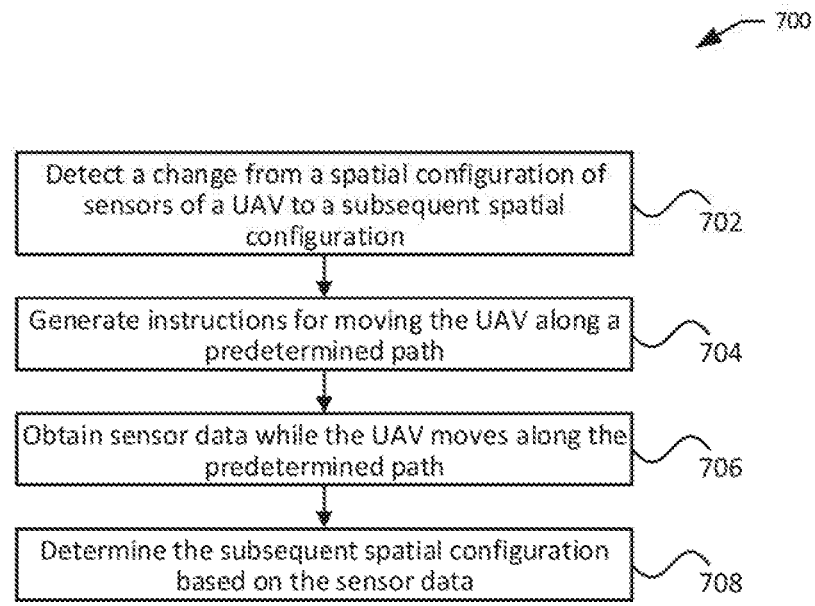
FIG. 7 illustrates an exemplary process for sensor calibration, in accordance with embodiments.

FIG. 7 illustrates an exemplary process 700 for sensor calibration, in accordance with embodiments. Aspects of the process 700 may be performed, in some embodiments, by one or more processors onboard and/or off-board a UAV. Some or all aspects of the process 700 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 702, a change is detected from an initial configuration of the sensors of a UAV to a subsequent configuration. As discussed above, initial configuration of the sensors can include an initial spatial configuration (e.g., positons and/or orientations) of the sensors. For example, the initial spatial configuration can be factory-set. A deviation from the initial spatial configuration may be determined based on a set of sensor data collected from the sensors. The sensor data may be collected when the UAV is in operation or at rest. In an embodiment, the detection of the deviation may be performed by one or more processors onboard the UAV. In another embodiment, the sensor data collected by the UAV may be provided to one or more remote processors, which then detect the deviation from the initial configuration based on the received sensor data. In some embodiments, the processing of the sensor data may be performed collectively by processors onboard and offboard the UAV.

A deviation from the initial spatial configuration can be determined using any suitable methods such as those described herein. For example, a deviation from a spatial configuration of a pair of stereo cameras (e.g., a left camera and a right camera) may be detected using epipolar constraint, which states that corresponding in the rectified left and right images should lie along corresponding epipolar lines assuming the cameras satisfy the pinhole camera model. If the deviation from the epipolar lines exceeds a threshold value, then the spatial configuration of the stereo cameras is considered to have deviated from the initial configuration. In other words, for each point seen by both the left camera and the right camera, the following constraint should be satisfied for the matching cost based on the existing spatial configuration:

$$\text{cost} = x_l^T [t]_x R x_r = 0$$

where $t=[1\ 0\ 0]$, R is a unit matrix. If the cost exceeds a certain threshold value, then a deviation from the initial spatial configuration is detected and a recalibration of the camera parameters is necessary.

Additionally or alternatively, the deviation from an initial spatial configuration of the cameras can be detected by comparing information derived from the image data from the cameras with information derived from other types of sensors. For instance, image data from the stereo cameras can be used to generate a 3D reconstruction of a plane facing the cameras and calculate an effective distance, $d_c$. The 3D reconstruction can be implemented using any suitable matching methods such as semi-global matching (SGM), least-squares matching, and the like. The calculated distance $d_c$ using the cameras can be compared with a distance $d_g$ calculated based on sensor data from one or more position sensors (e.g., ultrasound sensor, time-of-flight (TOF) sensor, laser radar). The disparity $disp_c$ corresponding to $d_c$, and the disparity $disp_g$ corresponding to $d_g$ are $$disp_c = \frac{f * b}{d_c}, \text{ and } disp_g = \frac{f * b}{d_g},$$

respectively. If the difference between the disparities exceeds a certain threshold (e.g., $|disp_c - disp_g| > 2$), then a deviation from the initial spatial configuration of the cameras is detected and a recalibration of the cameras may be necessary.

In some embodiments, detection of a deviation of the initial spatial configuration may involve the application of one or more statistical methods to the sensor data. One example of a statistical method that may be used to detect a deviation of the spatial configuration is a Mahalanobis distance method. The Mahalanobis distance method may compare measurements from different sensors after the measurements have been transformed into a uniform reference coordinate system. A covariance matrix can be generated between the measurements from different sensors in a uniform reference coordinate system. The covariance matrix may be updated in real time as measurement data from the sensors is received. The Mahalanobis distance can be calculated between the measurements from different sensors in a uniform reference coordinate system. If the Mahalanobis distance exceeds a preset threshold the Mahalanobis distance may indicate that the sensor is abnormal which may indicate that the sensors has drifted from its initial calibration. The preset threshold for a Mahalanobis distance to indicate an error may be at least 1, 2, 3, 4, 5, 6, 7, 8, 9, 10, 15, or 20. The threshold may be a uniform value for all of the sensors or the value may vary for each sensor. The threshold value may be fixed or it may vary with respect to an independent variable, for example time or distance traveled by the UAV.

At block 704, instructions are generated for moving the UAV along a predetermined path or pattern. The instructions may be generated in response to determining a change from the spatial configuration. The instructions may be generated by one or more processors onboard the UAV. Alternatively or additionally, the instructions may be generated by one or more processors offboard the UAV such as by a remote controller, a remote server, a mobile device, and the like. In some other embodiments, the instructions may be generated by a user using an input device. Further details on the generation of instructions are provided in FIG. 8. The instructions may cause the UAV to move along a predetermined movement path or pattern.

In some embodiments, the instructions can include human-readable user instructions that are displayed to a user. Such instructions may be used to induce actions by a user. For example, the user instructions can include text, images, visual signals (e.g. light), audio signals (e.g., voice recording, sound), haptic sensations (e.g., vibrations, heat), and the like. For example, the user instructions may be shown on a user interface such as discussed in FIG. 6. In another example, a UAV may be configured to show the instructions using lights, sound, or other signals. The user instructions may be shown by the same device that generates the user instructions or by a different device. For instance, a remote device may be configured to receive the instructions from another source (e.g., the UAV, a computer) and display the instructions on a display of the remote device. In another example, a remote computer may be configured to generate the instructions in response to the detected deviation and present the generated instructions on a display. In another example, a UAV may be configured to generate the instructions and show the instructions to a user (e.g., via light or sound).

In some other embodiments, the instructions may include executable instructions that can be executed by one or more processors onboard or offboard the UAV. For example, the instructions may be executed by the processors onboard the UAV to autonomously navigate according to a predetermined calibration movement path. In another example, the instructions may be executed by a remote controller to control the UAV to move according to the predetermined calibration movement path.

The instructions can optionally include instructions for data collection besides the movement instructions. The data collection instructions may include information about the sensors to be selected for data collection, sensor settings, the frequency and duration for collecting sensor data for calibration, and the like. In some embodiments, the data collection instructions may be generated by the same processors that generate the movement instructions or by different processors.

The data collection instructions may include executable instructions that are executable by one or more processors. The data collection instructions may be provided to and executed by the UAV and/or a remote controller. The data collection instructions may include user instructions in any suitable format (e.g., text, images, visual signals (e.g. light), audio signals (e.g., voice recording, sound), haptic sensations (e.g., vibrations, heat)). In some embodiments, the data collection instructions may be provided in a similar manner as described above for the movement instructions.

The data collection instructions may be provided with the movement instructions or separately. The data collection instructions and the movement instructions may be provided to the same entity or different entities. For instance, in an example, the movement instructions may be provided to a user who manually move the UAV or remotely control the UAV to move according to the movement instructions, whereas the data collection instruction may be provided to the UAV, which autonomously collect sensor data according to the data collection instructions. In some other examples, both the data collection instructions and the movement instructions are provided to a user, or the UAV.

At block 706, sensor data is collected while the UAV moves along the predetermined path or pattern. For example, the sensors may be controlled by one or more processors onboard the UAV to collect data. The sensor data may be collected continuously or at discrete sensing points in time and/or in space. In some embodiments, the sensor data may be collected according to the data collection instructions discussed above. In some other embodiments, the sensors may be controlled manually by a user and/or by an automated or semi-automated process. For example, a user may turn on some or all of the sensors for data collection before moving the UAV according to the calibration movement path, and/or turn off the sensors after the calibration movement. In another example, the sensors may be automatically activated and/or deactivated by certain triggering events such as time triggers, movement of the UAV, actions by a user, and the like.

At block 708, the subsequent spatial configuration is determined based on the sensor data. The subsequent spatial configuration may represent an actual spatial configuration of the sensors that deviates from the initial spatial configuration. For example, the subsequent configuration can include updated or recalibrated extrinsic parameters for the sensors. In one embodiment, the determination of the subsequent configuration can be performed by one or more processors onboard the UAV. In another embodiment, one or more remote processors offboard the UAV may receive collected sensor data from the UAV and determine the subsequent configuration based on the received sensor data. More details about determination of the subsequent configuration are provided in FIGS. 10-11.

In some embodiments, after the determination of the actual spatial configuration of the sensors, sensor data can be adjusted based on the actual spatial configuration to improve the accuracy of sensor measurement. For instance, the recalibrated extrinsic parameters may be used in sensor fusion algorithms to combine the measurements from different sensors. The adjustment may be performed while the UAV is in operation or at rest. In some embodiments, the adjustment of sensor data may be performed by one or more processors onboard and/or offboard the UAV.

Figure 8:
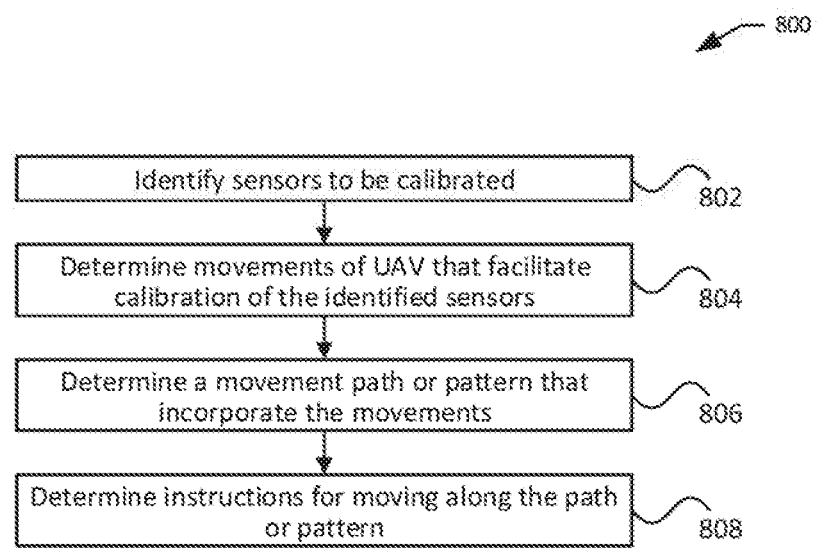
FIG. 8 illustrates an exemplary process for determining calibration instructions, in accordance with embodiments.

FIG. 8 illustrates an exemplary process 800 for determining calibration instructions, in accordance with embodiments. In particular, process 800 can be used to determine instructions for moving the UAV along a predetermined path or pattern based on the sensors to be calibrated. Aspects of the process 800 may be implemented by one or more processors onboard and/or offboard a UAV.

At block 802, sensors to be calibrated are identified. In some embodiments, the sensors whose configurations deviate from an initial configuration are identified as requiring recalibration. For instance, the methods described in block 702 of FIG. 7 can be used to determine whether the configuration for some or all of the sensors deviates from an initial configuration. If a deviation is detected, then the affected sensors can be identified as requiring recalibration. In some embodiments, the sensors to be calibrated may be selected based on other factors such as the type and/or condition of sensors, the time since last calibration, a condition of an environment of the UAV (e.g., weather), previous calibration information, and like. In some embodiments, the sensors that do not require calibration may also be identified because the sensor data from these sensors can be used to calibrate other sensors that do need to be calibrated.

At block 804, movements of UAV are determined, wherein the movements facilitate calibration of the identified sensors. For some sensors, certain types of sensor/UAV movements are more likely to result in more accurate and/or efficient sensor calibration. For instance, translational movements may facilitate more accurate or useful sensor measurement than rotational movements for vision sensors (e.g., stereo cameras). The opposite may be true for inertial sensors (e.g., IMU). Thus, if the set of identified sensors include a camera and an IMU, then both translational movements and rotational movements should be included in the calibration movements. The specific mix different types of movements to be included may depend on the mix of the types of sensors identified above. For example, when the identified sensors include more cameras, the percentage of translational movements may increase; and when the sensors to be calibrated include more inertial sensors, the percentage of rotational movements may increase.

At block 806, a movement path or movement pattern that incorporate some or all of the identified movements is determined. For instance, a relatively straight path may include only translational movements by the UAV; whereas a curvy path or a circular patter may incorporate both translational and rotational movements by the UAV. In some implementations, the movement path may be generated from scratch by combining the desired movement types. In some other implementations, a path or pattern is selected from one or more pre-generated paths or patterns based on the types of movements or sensors.

In some embodiments, determining the movement path or pattern includes modifying the movement path based on a surrounding environment of the UAV (e.g., obstacle avoidance), a physical limitation of the UAV (e.g., maximum rotational speed, degrees of freedom, battery life), a skill level of a user (e.g., simple and easy-to-execute patterns for an average user and more complex patterns for more experienced users), regulations (e.g., restrictive flight zones), and other constraints.

At block 808, calibration instructions are determined for moving the UAV along the movement path or pattern. As discussed herein, the instructions may include user instructions and/or instructions executed by one or more processors onboard or offboard the UAV. User instructions may include description (e.g., in text, visual, or audio format) of the movement path or pattern and/or how to move the UAV to achieve the desired movements. The executable instructions may be used to control one or more actuating members of the UAV (e.g., motors, rotors) so as to cause the UAV to change a position and/or a pose at different points in time. In some embodiments, the block 806 may be optional and the instructions may be generated based on the UAV movements determined at block 804. The generation of the instructions can include producing new instructions, or retrieving existing instructions. For example, a plurality of calibration paths and/or movement instructions may be preloaded on a UAV, a remote controller, or a mobile device, and the suitable calibration paths or movement instructions may be selected from the plurality based on the sensors to be recalibrated, as described above.

The instructions may be specified any suitable level of details and/or complexity. For example, user instructions may include relatively high-level user instructions such as "move the UAV in a circular motion in front of you" or more specific step-by-step user instructions on how to navigate the UAV along a movement path. As another example, executable instructions can include high-level commands that need to be broken down to smaller tasks or low-level instructions that are then executed. The specificity and/or complexity of the instructions may depend on the computing resources of the entity generating the instructions. For example, more detailed instructions may be generated by a device with powerful processors; and vice versa. The skill level of the user receiving the instructions may also be considered. For instance, high-level or less detailed instructions may be generated for a more experienced user; and vice versa. The computing resources of the entity receiving and/or executing the instructions may also be considered. For instance, high-level instructions may be generated for a device with powerful processors; and vice versa.

In some embodiments, instructions for collecting sensor data for calibration may be determined. The data collection instructions may be determined based on the characteristics of the sensors that will collect sensor data, the calibration movement path of the UAV, the resources available on the UAV (e.g., battery life, processing power, data storage space), the duration of the calibration, and the like. The data collection instructions may include timing information (e.g., start/end time, duration, frequency), the amount and/or types of sensor data to be collected, settings of the sensors (e.g., resolution, sampling rate, shutter speed, focal length), and the like. Similar to the movement instructions, the data collection instructions can be specified at any suitable level of specificity based on factors similar to those discussed above.

Figure 9:
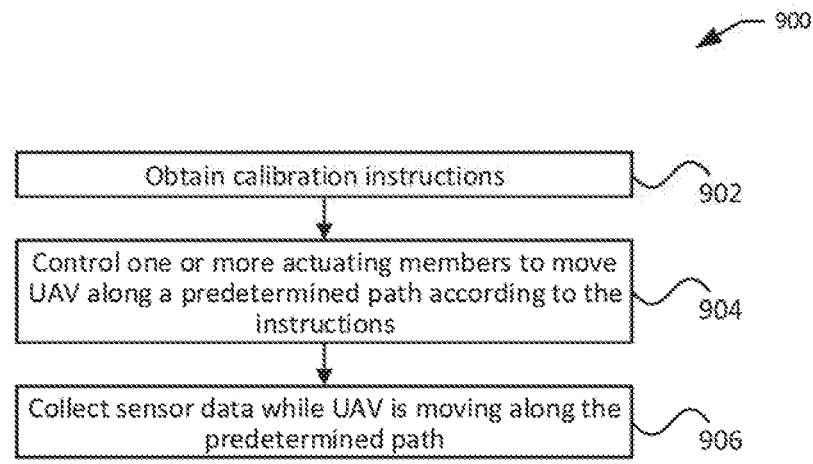
FIG. 9 illustrates an exemplary process for performing sensor calibration according to calibration instructions, in accordance with embodiments.

FIG. 9 illustrates an exemplary process 900 for performing sensor calibration according to calibration instructions, in accordance with embodiments. In some embodiments, aspects of the process 900 may be performed by one or more processors onboard and/or offboard a UAV.

At block 902, calibration instructions are obtained. The calibration instructions may be generated in response to detecting of a deviation of the sensors from an initial configuration. In some embodiments, the instructions may be received by the UAV from a remote device which generated the instructions. In some other embodiments, the instructions may have been generated by the one or more processors onboard the UAV. In various embodiments, the calibration instructions may be obtained when the UAV is landed or when the UAV is in the air. The calibration instructions may include movement instructions and/or data collection instructions that are executable by the one or more processors onboard and/or offboard the UAV.

At block 904, one or more actuating members of the UAV may be controlled to move the UAV along a predetermined path or pattern according to the calibration instructions. The actuating members can include one or more rotors or motors that can be controlled to allow the UAV to move rotationally or translationally in space. The calibration instructions may be processed, by one or more processors onboard and/or offboard the UAV, to determine the control signals for the actuating members based on the current state of the UAV, the surrounding environment of the UAV (e.g., obstacle avoidance), and other factors. For examples, if the UAV is in the air before calibration starts, then actuating members may be controlled to move the UAV to a given position and/or pose before moving along the predetermined path or pattern according to the instructions. If the UAV at rest before the calibration starts, the actuating members may be controlled to enable the UAV to takeoff before navigating along the predetermined path according to the instructions. Optionally, the actuating members may be controlled to enable the UAV to land after the sensor data for calibration has been collected.

At block 906, sensor data can be collected while UAV moves along the predetermined path or pattern. Some or all sensors onboard the UAV may be controlled by one or more processors onboard and/or offboard the UAV to collect sensor data. The sensors that collect sensor data may include the sensors that need to be calibrated (e.g., because of a deviation from an initial configuration) and optionally sensors that do not need to be calibrated. In some implementations, sensor data from the sensors that do not need to be calibrated (e.g., GPS sensors) can be used to calibrate the sensors that do need to be calibrated (e.g., IMU, cameras). In some embodiments, the sensors may be controlled to collect sensor data based on data collection instructions generated in response to detecting a deviation from the initial spatial configuration of the sensors. The data collection instructions may have been obtained as a part of the calibration instructions obtained at block 902 above. The data collection instructions and the movement instructions may be obtained together or separately. In other embodiments, the sensors may be controlled to collect sensor data not based on the calibration instructions but based on other predetermined triggers.

In some embodiments, the collected sensor data may be processed by one or more processors onboard and/or offboard the UAV to determine the subsequent (actual) spatial configuration of the sensors. In general, the various aspects of sensor calibration described herein can be allocated among a UAV, a remote controller, and/or a user or any combination thereof in any suitable manner. For instance, in one embodiment, the UAV may autonomously navigate along a predetermined calibration path, collect sensor data, and calibrate the sensor parameters based on the collected sensor data. In another embodiment, the UAV may autonomously navigate along a predetermined calibration path and collect sensor data, but the collected sensor data may be transmitted to a remote device, which then processes the sensor data to calibrate the sensors onboard the UAV. In another embodiment, the UAV may be controlled by a user (e.g., by hand or by a remote controller) to move along a predetermined calibration path, but UAV may autonomously collect sensor data during the movements and calibrate the sensor parameters based on the collected sensor data. In another embodiment, the UAV may be controlled by a user (e.g., by hand or by a remote controller) to move along a predetermined calibration path, but UAV may autonomously collect sensor data during the movements. The sensor data may be transmitted to a remote device which then calibrate the sensor parameters based on the collected sensor data. In another embodiment, the UAV may be controlled by a user (e.g., by hand or by a remote controller) to move along a predetermined calibration path, and the UAV may be controlled by the user to collect sensor data during the movements. The collected sensor data may be processed by the UAV or by a remote device. Where the sensor data is processed offboard the UAV, the calibration results may be transmitted back to the UAV in some embodiments. In various embodiments, the allocation of the various aspects of the sensor calibration process may be determined on type of sensors to be calibrated, characteristics of the UAV and/or remote devices, and a skill level of a user, and any other factors.

Figure 10:
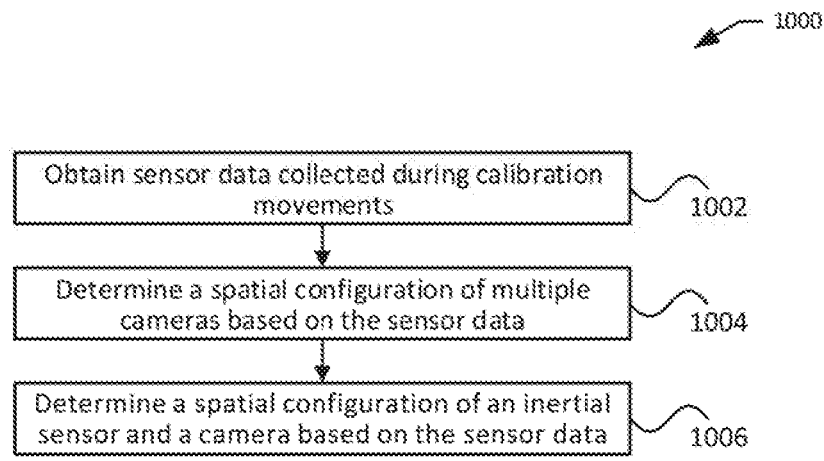
FIG. 10 illustrates an exemplary process for calibrating sensor parameters based on collected sensor data, in accordance with embodiments.

FIG. 10 illustrates an exemplary process 1000 for calibrating sensor parameters based on collected sensor data, in accordance with embodiments. In particular, the same set of sensor data may be used to calibrate multiple sensors of different types. For example, the same set of sensor data can be used to perform camera-camera calibration and camera-IMU calibration as described below. Aspects of the process 1000 may be implemented by one or more sensors onboard and/or offboard a UAV.

At block 1002, a set of sensor data collected during the calibration movements is obtained. The set of sensor data can include sensor data from one or more sensors such as cameras, inertial sensors, positions sensors, and the like. The sensor data may be collected in a manner described elsewhere herein. In some embodiments, the sensor data may be stored in a data storage onboard the UAV and obtained by one or more sensors onboard the UAV. Alternatively, the sensor data may be provided by the UAV to one or more processors offboard the UAV, such as in a remote computer.

At block 1004, a spatial relationship between at least to cameras can be determined based on the set of obtained sensor data. In particular, the transformation between the corresponding points in the respective camera reference frames are determined. The transformation can include, for example, a rotation matrix R and a translation vector t.

In an embodiment, an essential matrix E is determined (including estimation) for given a set of corresponding image points in the images taken by a pair of stereo cameras. The essential matrix E that optimally satisfies the constraints of the corresponding image points. Let $X_L$ represent the coordinates of point P in the left-eye camera's reference frame, let $X_R$ represents the coordinates of P in the right-eye camera's reference frame, and let R and T represent the rotation and translation between the two reference frames, then $X_R=R(X_L-T)$ is the relationship between the coordinates of P in the two reference frames. Then, the coplanarity constraints in epipolar geometry can be expressed by (y') $^TEy=0$, where $E=RT$, y and y' are the normalized image coordinates of the projections of P onto the left and right image planes.

The essential matrix E can be estimated using eight-point algorithm (described below) or any other suitable algorithms. In a first step, a homogeneous linear equation can be formulated. With $$y = \begin{pmatrix} y_1 \\ y_2 \\ 1 \end{pmatrix}, \text{ and } y' = \begin{pmatrix} y'_1 \\ y'_2 \\ 1 \end{pmatrix}, \text{ and } E = \begin{pmatrix} e_{11} & e_{12} & e_{13} \\ e_{21} & e_{22} & e_{23} \\ e_{31} & e_{32} & e_{33} \end{pmatrix}$$

The constraint can also be rewritten as $$y'_1 y_1 e_{11} + y'_1 y_2 e_{12} + y'_1 e_{13} + y'_2 y_1 e_{21} + y'_2 y_2 e_{22} + y'_2 e_{23} + y_1 e_{31} + y_2 e_{32} + e_{33} = 0 \text{ or } e \cdot \tilde{y} = 0$$

$$\text{Where } \tilde{y} = \begin{pmatrix} y'_1 y_1 \\ y'_1 y_2 \\ y'_1 \\ y'_2 y_1 \\ y'_2 y_2 \\ y'_2 \\ y_1 \\ y_2 \\ 1 \end{pmatrix}, \text{ and } e = \begin{pmatrix} e_{11} \\ e_{12} \\ e_{13} \\ e_{21} \\ e_{22} \\ e_{23} \\ e_{31} \\ e_{32} \\ e_{33} \end{pmatrix}$$

Each pair of corresponding image points produces a vector $\tilde{y}$. Given a set of 3D points $P_k$, the corresponding set of vectors $\tilde{y}_k$ must satisfy $e \cdot \tilde{y}_k = 0$. Given sufficiently many (at least eight) linearly independent vectors $\tilde{y}_k$ it is possible to determine e as the solution to a homogeneous linear equation:

$$e^T Y = 0$$

In a second step, the above linear equation is solved. An approach to solving this equation implies that e is a left singular vector of Y corresponding to a singular value that equals zero. Provided that at least eight linearly independent vectors $\tilde{y}_k$ are used to construct Y it follows that this singular vector is unique (disregarding scalar multiplication) and, consequently, e and then E can be determined.

In the case that more than eight corresponding points are used to construct Y it is possible that it does not have any singular value equal to zero. This case occurs in practice when the image coordinates are affected by various types of noise. A common approach to deal with this situation is to describe it as a total least squares problem; find e which minimizes $\|e^T Y\|$ when $\|e\|=1$. The solution is to choose e as the left singular vector corresponding to the smallest singular value of Y. A reordering of this e back into a 3×3 matrix gives the result of this step, here referred to as $E_{est}$.

In a third step, the internal constraint of the essential matrix is enforced. The internal constraint of the essential matrix states that two of its singular values are equal and nonzero and the other is zero. To ensure that the estimated matrix $E_{est}$ satisfies the internal constraint, we need to find the matrix E' of rank 2 which minimizes $\|E'-E_{est}\|$. The solution can be given by first computing a singular value decomposition of $E_{est}$: $E_{est}=USV^T$ U, V are orthogonal matrices and S is a diagonal matrix which contains the singular values of $E_{est}$. In the ideal case, one of the diagonal elements of S should be zero, or at least small compared to the other two which should be equal. Set $$S' = \begin{pmatrix} (s_1+s_2)/2 & 0 & 0 \\ 0 & (s_1+s_2)/2 & 0 \\ 0 & 0 & 0 \end{pmatrix}$$

Where $s_1$, $s_2$ are the two larger singular values in S. Finally, E' is given by $E'=US'V^T$. The matrix E' is the resulting estimate of the essential matrix provided by the algorithm. The eight-point algorithm provides a non-limiting example. Any other suitable algorithm for determining the essential matrix may be used.

Given that the essential matrix E has been determined for a stereo camera pair, for example, using the estimation method above, this information can be used for determining also the rotation and translation (up to a scaling) between the two camera's coordinate systems. For example, a rotation matrix R and a translation vector t can be determined based on performing a single value decomposition (SVD) of E, as described below. It is also possible to determine R and t without an SVD using other suitable methods.

An SVD of E gives $$E = U\Sigma V^T$$

where U and V are orthogonal 3×3 matrices and E is a 3×3 diagonal matrix with $$\Sigma = \begin{pmatrix} s & 0 & 0 \\ 0 & s & 0 \\ 0 & 0 & 0 \end{pmatrix}$$

The diagonal entries of $\Sigma$ are the singular values of E which, according to the internal constraints of the essential matrix, must consist of two identical and one zero value. Define $$W = \begin{pmatrix} 0 & -1 & 0 \\ 1 & 0 & 0 \\ 0 & 0 & 1 \end{pmatrix}$$

With $$W^{-1} = W^T = \begin{pmatrix} 0 & 1 & 0 \\ -1 & 0 & 0 \\ 0 & 0 & 1 \end{pmatrix}$$

and make the following ansatz:

$$[t]_X = UZV^T \text{ where } Z = \begin{pmatrix} 0 & 1 & 0 \\ -1 & 0 & 0 \\ 0 & 0 & 1 \end{pmatrix}.$$

In some embodiments, the process for determining the configuration (e.g., spatial relationship) between a pair of stereo cameras can be generalized to determine the configuration of more than two cameras.

At block 1006, a spatial relationship between an inertial sensor (e.g., IMU) and a camera can be determined based on the same set of sensor data obtained at block 1002. The principle of this calibration is based on acquiring multiple images over time by the camera and estimating the self-position changes by the camera. In some instances, the method of calibration is the similar to calibrating two impendent cameras by considering two images of the camera taken at different times i and i' as taken by two cameras α and β. Similarly, the calibration scheme can be applied to IMU. Let A and B denote self-coordinate changes of the camera and the inertial sensor (e.g., IMU), respectively. Place subscripts i to denote the coordinate system mappings $A_i$ and $B_i$ at time i=1, 2, ..., n. It follows that the mappings at time 2 relevant to time 1 are: $A=A_2A_1^{-1}$ and $B=B_2B_1^{-1}$. Let X denote the mapping between camera and the inertial sensor (e.g., IMU), the hand-eye calibration formula leads to AX=XB. Find X that minimizes ∥AX−XB∥. A, B, X are normalized mapping with following form:

$$A = \begin{pmatrix} R_A & t_A \\ 0 & 1 \end{pmatrix}, B = \begin{pmatrix} R_B & t_B \\ 0 & 1 \end{pmatrix}, X = \begin{pmatrix} R_X & t_X \\ 0 & 1 \end{pmatrix}.$$

Furthermore, $R_A R_X = R_X R_B$ and $(R_A-1)t_X = R_X t_B - t_A$. Following these equations and taking into account the properties of rotation matrices, there are multiple ways to solve $R_x$ and $t_x$. To guarantee a unique solution, a requirement on n≥3 needs to be enforced.

The hand-eye calibration method described above is used as a non-limiting example. Any other sensor calibration methods may be used. In some embodiments, the camera-inertial sensor calibration method described herein can be used to determine the respective spatial relationship between the inertial sensor and more than one cameras. The cameras may or may not include stereo cameras. In some embodiments, the more than one cameras can include multiple pairs of stereo vision cameras facing different directions. Once the relationship between inertial sensor and the cameras is determined, the relationship between the cameras is also known. In some embodiments, the more than one cameras can include at least one mono-vision camera that does not form a stereo vision system with another camera. Once the relationship between inertial sensor and the cameras is determined, the relationship between the cameras is also known.

Figure 11:
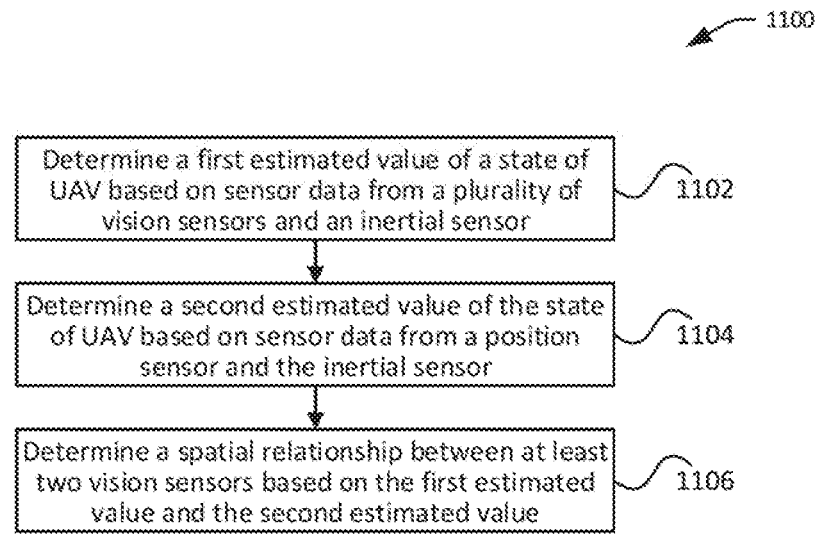
FIG. 11 illustrates an exemplary process for processing sensor data for sensor calibration, in accordance with embodiments.

In some embodiments, calibration results can be corrected or otherwise modified using measurements from additional sensors. FIG. 11 illustrates an exemplary process 1100 for processing sensor data for sensor calibration, in accordance with embodiments. For example, sensor data from a position sensor (e.g., GPS) can be used to further determine one or more extrinsic parameters of plurality of vision sensor by comparing the sensor fusion result between the position sensor and an inertial sensor (e.g., IMU) and the sensor fusion result between the inertial sensor and vision sensors.

As an example, the camera calibration methods described in FIG. 10 may assume that the baseline between two cameras remain unchanged (i.e., does not deviate from the initial configuration), when in fact, the baseline may change by a scalar a in actual (subsequent) configuration. The process 1100 can be used to determine the baseline parameter of the spatial relationship between the two cameras, αb, by determining the scalar a (where b is the initial baseline).

At block 1102, a first estimated value of a state of UAV is determined based on sensor data from an inertial sensor and a plurality of vision sensors. The plurality of vision sensors may include one or more pairs of stereo vision sensors. Using one pair of stereo vision sensor as an example. The image data from the two vision sensors can be fused with the sensor data from the inertial sensor based at least in part on the spatial configuration of the sensors (e.g., between the vision sensors and the inertial sensor and between the vision sensors). The spatial configuration of the sensors may have been determined using the sensor calibration techniques described herein. The state of the UAV can include a velocity v of the UAV, which can be determined from sensor data from the stereo image sensors:

$$z = \frac{fb}{d}, v = \frac{\text{translation}}{\text{frequency}} \cdot z = \frac{\text{translation}}{\text{frequency}} \cdot \frac{fb}{d}$$

Where f is the focal length of the vision sensors, b is the baseline between the sensors, and d is the disparity between corresponding image points. As shown in the above formula, the velocity v calculated based on stereo images is proportional to the baseline. However, the camera-camera calibration methods described in FIG. 10 may not determine the actual value of the baseline distance between the vision sensors. Rather, the actual baseline is ab, where a is a scalar.

The stereo-vision-based estimate of the UAV state (velocity) can be combined with the estimate of the UAV state using inertial sensor (e.g., IMU) using any suitable sensor fusion algorithm and based on the calibrated spatial configuration between the vision sensors and the inertial sensor. For instance, the estimated velocity of the UAV based on vision-IMU fusion may be represented by a 3-dimentional vector $V_{o,i}$, where i=1, 2, 3, . . . , n.

At block 1104, a second estimated value of the state of the UAV is determined based on sensor data from a position sensor and the inertial sensor. The position sensor can include a GPS sensor, a lidar, an ultrasound sensor, and the like. In some embodiments, the position sensor may be tested to determine the reliability of its sensor data prior to using the sensor data and only when the sensor data is determined to be reliable is the sensor data used in this step. For a GPS sensor, for example, the strength or reliability of the GPS signals may be indicated by a sufficiently high GPS signal power level, a sufficiently high signal-to-noise ratio, a sufficient low dilution of precision (DOP), smaller fluctuation in measurement data, and/or other similar measurement.

The sensor data from the position sensor (e.g., GPS) and the inertial sensor (e.g., IMU) may be fused using any suitable sensor fusion algorithm to estimate a second value of the state of the UAV. For instance, the estimated velocity of the UAV based on GPS-IMU fusion may be represented by a 3-dimentional vector $V_{g,j}$ where j=1, 2, 3, . . . , n.

At block 1106, spatial relationship between at least two vision sensors can be determined based at least in part on the first estimated value and the second estimated value of the UAV state. For instance, the baseline ab between two vision sensors can be determined by solving for α in the following minimization problem using a nonlinear optimization algorithm (e.g., Levenberg-Marquardt algorithm):

$$\min_{\alpha} \sum_{i=1}^{n} norm(V_{g,j} - \alpha V_{0,i})$$

In some embodiments, the method described above can be used to calibrate baselines (or scalars thereof) for multiple pairs of vision sensors.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^{33}$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
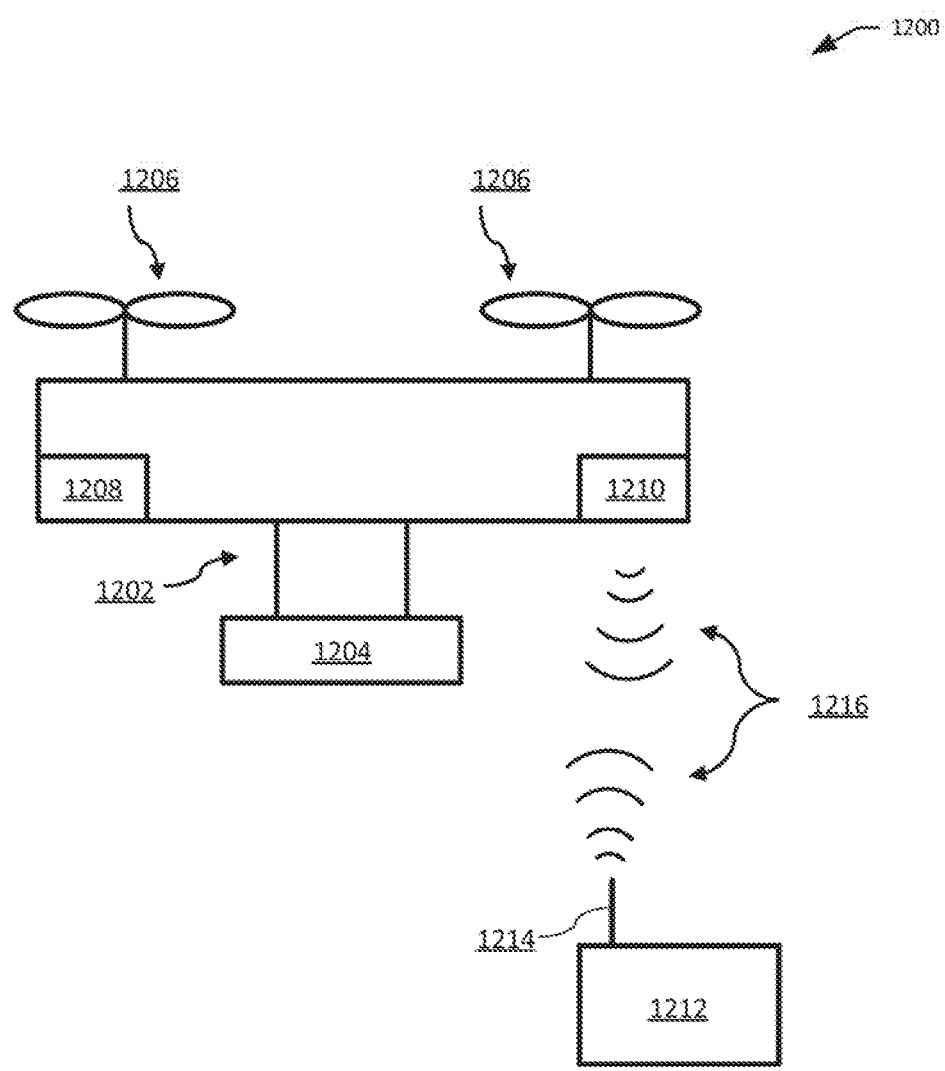
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication; such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera).

In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
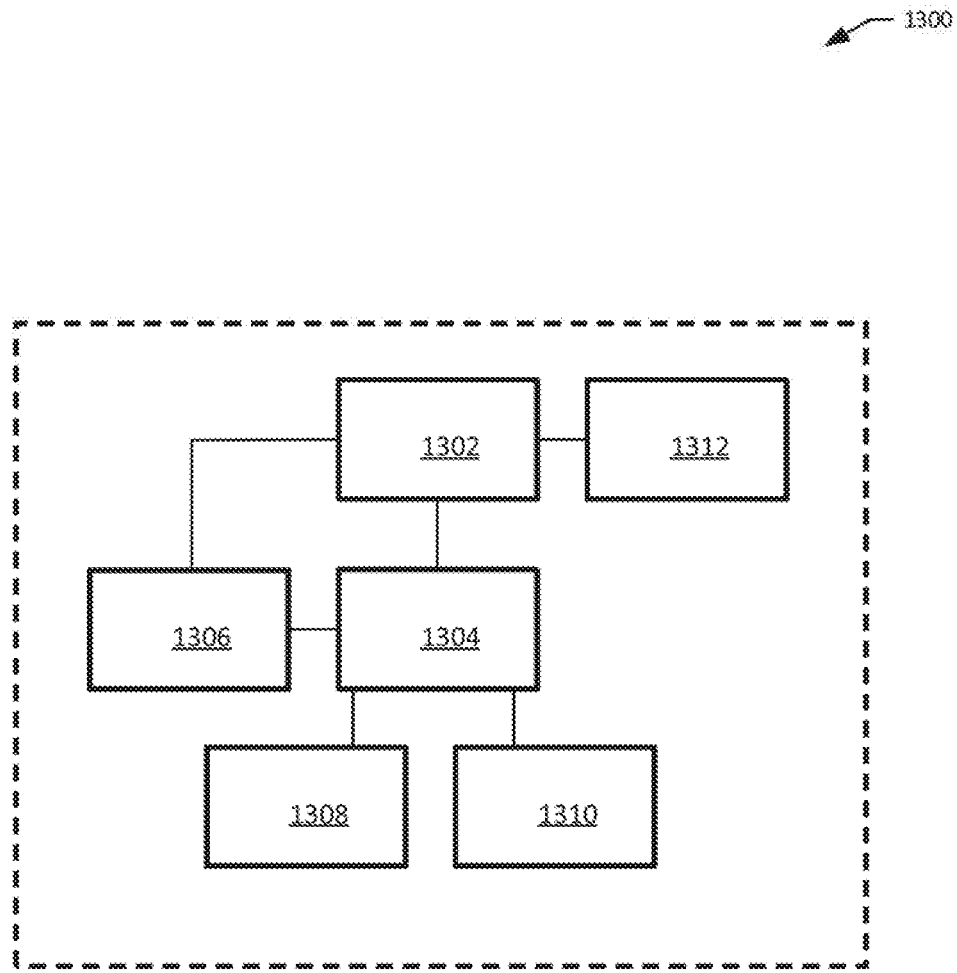
FIG. 13 is a schematic illustration by way of block diagram of a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable processor (e.g., a central processing unit (CPU)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A computer-implemented method, comprising:
   detecting, based on a first set of sensor data from a plurality of sensors coupled to an unmanned aerial vehicle (UAV), a change in a spatial configuration of the plurality of sensors;
   in response to detecting the change in the spatial configuration, generating one or more calibration instructions to cause the UAV to move along a predetermined pattern, wherein the one or more calibration instructions include human-readable user instructions that are displayed on a user interface; and
   determining a subsequent spatial configuration of the plurality of sensors based at least in part on a second set of sensor data from the plurality of sensors, wherein the second set of sensor data is collected by the plurality of sensors when the UAV is moving along the predetermined pattern.

2. The method of claim 1, wherein the plurality of sensors comprise at least two different types of sensors.

3. The method of claim 2, wherein the plurality of sensors comprise at least two vision sensors and an inertial sensor.

4. The method of claim 1, wherein generating the one or more calibration instructions comprises selecting the predetermined pattern from a plurality of predetermined paths based at least in part on the plurality of sensors.

5. The method of claim 1, wherein moving along the predetermine pattern includes making translational movements and rotational movements.

6. The method of claim 1, wherein the human-readable user instructions describe how to manually move the UAV along the predetermined pattern.

7. The method of claim 1, wherein the human-readable user instructions describe how to remotely control the UAV to move along the predetermined pattern.

8. The method of claim 1, wherein the one or more calibration instructions include computer-executable calibration instructions that are executed by one or more processors onboard the UAV so as to cause the UAV to move along the predetermined pattern.

9. The method of claim 1, wherein determining the subsequent spatial configuration comprises:
   determining a first spatial relationship between at least two vision sensors of the plurality of sensors based at least in part on the second set of sensor data; and
   determining a second spatial relationship between a vision sensor and an inertial sensor of the plurality of sensors based at least in part on the second set of sensor data.

10. The method of claim 9, wherein determining the subsequent spatial configuration further comprises determining a parameter of the first spatial relationship based at least in part on sensor data from a position sensor.

11. The method of claim 10, wherein the parameter of the first spatial relationship is a baseline distance between the at least two vision sensors.

12. The method of claim 10, wherein determining the parameter of the first spatial relationship comprises:
   determining a first estimated value of a state of the UAV using the at least two vision sensors and the inertial sensor;
   determining a second estimated value of the state of the UAV using the position sensor and the inertial sensor; and
   processing the first estimated value and the second estimated value to determine the parameter of the first spatial relationship.

13. The method of claim 12, wherein the state of the UAV comprises a velocity.

14. A computer system, comprising:
   a non-transitory memory that stores one or more computer-executable instructions; and
   one or more processors configured to access the memory and execute the computer-executable instructions to perform steps comprising:
      detecting, based on a first set of sensor data from a plurality of sensors coupled to an unmanned aerial vehicle (UAV), a change in a spatial configuration of the plurality of sensors;
      in response to detecting the change in the spatial configuration, generating one or more calibration instructions to cause the UAV to move along a predetermined pattern, wherein the one or more calibration instructions include human-readable user instructions that are displayed on a user interface; and
      determining a subsequent spatial configuration of the plurality of sensors based at least in part on a second set of sensor data from the plurality of sensors, wherein the second set of sensor data is collected by the plurality of sensors when the UAV is moving along the predetermined pattern.

15. The computer system of claim 14, wherein the plurality of sensors comprise at least two different types of sensors.

16. The computer system of claim 15, wherein the plurality of sensors comprise at least two vision sensors and an inertial sensor.

17. The computer system of claim 14, wherein generating the one or more calibration instructions comprises selecting the predetermined pattern from a plurality of predetermined paths based at least in part on the plurality of sensors.

18. The computer system of claim 14, wherein moving along the predetermine pattern includes making translational movements and rotational movements.

19. The computer system of claim 14, wherein the human-readable user instructions describe how to manually move the UAV along the predetermined pattern.

20. The computer system of claim 14, wherein the human-readable user instructions describe how to remotely control the UAV to move along the predetermined pattern.

21. The computer system of claim 14, wherein the one or more calibration instructions include computer-executable calibration instructions that are executed by one or more processors onboard the UAV so as to cause the UAV to move along the predetermined pattern.

22. The computer system of claim 14, wherein determining the subsequent spatial configuration comprises:
   determining a first spatial relationship between at least two vision sensors of the plurality of sensors based at least in part on the second set of sensor data; and
   determining a second spatial relationship between a vision sensor and an inertial sensor of the plurality of sensors based at least in part on the second set of sensor data.

23. The computer system of claim 22, wherein determining the subsequent spatial configuration further comprises determining a parameter of the first spatial relationship based at least in part on sensor data from a position sensor.

24. The computer system of claim 23, wherein the parameter of the first spatial relationship is a baseline distance between the at least two vision sensors.

25. The computer system of claim 23, wherein determining the parameter of the first spatial relationship comprises:
   determining a first estimated value of a state of the UAV using the at least two vision sensors and the inertial sensor;
   determining a second estimated value of the state of the UAV using the position sensor and the inertial sensor; and
   processing the first estimated value and the second estimated value to determine the parameter of the first spatial relationship.

26. The computer system of claim 25, wherein the state of the UAV comprises a velocity.

27. One or more non-transitory computer-readable storage media storing computer-executable instructions that, when executed by a computing system, configure the computing system to perform operations comprising:
   detecting, based on a first set of sensor data from a plurality of sensors coupled to an unmanned aerial vehicle (UAV), a change in a spatial configuration of the plurality of sensors;
   in response to detecting the change in the spatial configuration, generating one or more calibration instructions to cause the UAV to move along a predetermined pattern, wherein the one or more calibration instructions include human-readable user instructions that are displayed on a user interface; and
   determining a subsequent spatial configuration of the plurality of sensors based at least in part on a second set of sensor data from the plurality of sensors, wherein the second set of sensor data is collected by the plurality of sensors when the UAV is moving along the predetermined pattern.

28. A method for sensor calibration, comprising:
   detecting, based on a first set of sensor data from a plurality of sensors coupled to movable object, a change in a spatial configuration of the plurality of sensors;
   in response to detecting the change in the spatial configuration, collecting a second set of sensor data from the plurality of sensors while the movable object moves along a predetermined calibration pattern that is generated based on one or more calibration instructions, wherein the one or more calibration instructions include human-readable user instructions that are displayed on a user interface; and
   determining a subsequent spatial configuration of the plurality of sensors based at least in part on the second set of sensor data.

* * * * *